United States Patent [19]

Stevens

[11] Patent Number: 4,543,052
[45] Date of Patent: Sep. 24, 1985

[54] APPARATUS FOR INSULATED BUILDING BLOCK

[76] Inventor: Garry B. Stevens, 26 Welsford Gardens, Ste. 403, Don Mills, Ontario, Canada, M3A 2P5

[21] Appl. No.: 642,848

[22] Filed: Aug. 21, 1984

[51] Int. Cl.⁴ .......................... B29C 27/30; B28B 1/00
[52] U.S. Cl. .................................... 425/110; 425/123; 425/817 R
[58] Field of Search ............... 425/110, 123, 127, 128, 425/817 R; 264/46.2, 46.3

[56] References Cited

U.S. PATENT DOCUMENTS

| | | | |
|---|---|---|---|
| 2,964,820 | 12/1960 | Olson et al. | 425/110 |
| 3,058,190 | 10/1962 | Wogulis et al. | 425/110 |
| 3,203,069 | 8/1965 | Wogulis et al. | 425/123 |
| 3,287,782 | 11/1966 | McClarney | 425/110 X |
| 3,315,327 | 4/1967 | McClarney | 425/110 |
| 3,522,336 | 7/1970 | Piper et al. | 425/123 X |
| 3,694,533 | 9/1972 | Kilsey | 425/123 X |
| 4,295,810 | 10/1981 | Dennert et al. | 425/110 |

Primary Examiner—J. Howard Flint, Jr.
Attorney, Agent, or Firm—Arne I. Fors; Robert F. Delbridge

[57] ABSTRACT

A method and apparatus for forming insulated concrete blocks in which at least two and preferably three concrete blocks are fed concurrently to the inlet end of the apparatus having a pair of opposed, continuous upper and lower conveyors for concurrently passing said blocks through the apparatus, and a foam injection system for delivering foam to the cavity or cavities formed between the blocks, wherein continuous strips of an impermeable material such as polyfilm are fed to bottom, ends and upper sides of the cavity or cavities to form an impermeable barrier between the foam and conveyors to substantially prevent escape of said foam from the said cavity or cavities. Former plates secured to end frames carried by the lower conveyor and former plates secured to transverse segments comprising the upper and lower conveyors interact with the former plates secured to end frames to provide a desired shape to the foam insulation.

The center block of three concrete blocks forming a unit is split longitudinally after curing of the insulating foam to expose an aesthetic block face.

10 Claims, 6 Drawing Figures 4,543,052

APPARATUS FOR INSULATED BUILDING BLOCK

BACKGROUND OF THE INVENTION

This invention relates to an apparatus for forming insulated concrete blocks and, more particularly, relates a method and apparatus for concurrently forming one or more concrete blocks having at least one insulating cavity coextensive with the height and length of the blocks.

Conventional concrete blocks have air cavities extending the height and a portion of the length of the blocks to reduce weight and to provide dead air cells. However, concrete itself is a poor heat insulator and the air cavities in the blocks, normally interconnected in a wall structure, permit sufficient air movement to negate much of the heat insulating properties of the blocks.

Canadian Pat. No. 1,149,189 issued July 5, 1983 describes an insulated concrete block having one or more mould cavities extending the full length of the block filled with insulation material foamed-in-place.

SUMMARY OF THE INVENTION

It is a principal object of the present invention to provide an apparatus for forming monolithic concrete blocks having a sandwich construction with opposite exterior concrete faces, one or both of which can be made asthetically pleasing, and an intermediate foamed-in-place, heat insulating layer for adhesively bonding the block components together of the type described in aforesaid Canadian Pat. No. 1,149,189.

It is another object of the invention to provide an apparatus for reproducably forming monolithic concrete blocks having a shape adapted to self position and to interlock adjacent blocks to facilitate erection in a wall structure.

Another object of the present invention is the provision of an apparatus for the concurrent production of a pair of monolithic concrete blocks forming a mirror image of each other and having a common centre component with a pair of foam insulation layers formed in situ under pressure adjacent exterior concrete components.

The apparatus of the invention for forming insulated concrete blocks comprises in its broad aspect, a frame having an inlet end and an outlet end; a pair of opposed, continuous, upper and lower conveyors indexed for synchronous travel within said frame, said upper conveyor being shorter than the lower conveyor; each of said conveyors having a plurality of transverse, articulated segments adapted to provide a planar surface in its operative position when the conveyors are opposed to each other; the lower of said conveyors having a plurality of equispaced end frames secured thereto perpendicular to the direction of travel of the conveyor, each of said end frames having a resilient former secured to the front and rear faces thereof; forming plates secured to the transverse segments of the upper and lower conveyors for sequentially receiving a plurality of laterally-spaced concrete blocks therebetween defining at least one cavity between said blocks; a foam delivery system for forming heat insulating foam in situ into said cavity; means for feeding a continuous strip of impermeable plastic film to said conveyors for enclosing the cavities and interposing an impermeable barrier between the foam and the conveyors; and lateral containment wheels mounted on each side of the frame for providing lateral support to the blocks as they are formed.

The said apparatus includes means for feeding at least one continuous lower strip of impermeable film to the lower conveyor to envelope the end frame for closing the opposite ends and bottom of the said cavity and means for feeding at least one upper continuous strip of impermeable plastic film downstream of said foam delivery system for enclosing the top of said cavity whereby heat insulating foam formed in situ in said cavity is substantially completely contained within said cavity. The lower and upper continuous impermeable strips each preferably comprises a double-walled strip formed of flattened tubular stock of polyfilm such as polyethylene or polypropylene.

The frame of the apparatus has a vertically reciprocal guillotine mounted at the inlet end thereof, a double acting piston-cylinder operatively connected to said guillotine for raising and lowering said guillotine, and a diagonal plate forming a lower part of said guillotine extending transversely thereof whereby said diagonal plate engages the rear ends of said laterally-spaced concrete blocks as they are fed to the inmate end of the apparatus for advancing said blocks to the adjacent end frame and for positioning the lower continuous strip of polyfilm against the rear ends of said blocks for engagement by the next succeeding end frame.

Adjusting means are provided for raising and lowering the upper conveyor relative to the lower conveyor whereby the height of the cavity between said blocks can be adjusted and a reciprocal table mounted at the inlet end of the apparatus frame laterally aligns and feeds a plurality of concrete blocks to the inlet end of the apparatus.

The spaced concrete blocks preferably comprise a centre block and a pair of laterally-spaced back-up blocks, said centre blocks and laterally-spaced back-up blocks defining a pair of cavities therebetween. The foam delivery system for forming heat insulating foam in situ into said cavity or cavities is located above said lower conveyor ahead of the upper conveyor whereby said insulating foam can be injected after said lower continuous strip of polyfilm has been applied to the ends and bottoms of the cavity prior to covering of said cavity with the upper impermeable polyfilm.

BRIEF DESCRIPTION OF THE DRAWINGS

The foregoing and other objects of the invention and the manner in which they can be attained will become apparent from the following detailed description of the drawings, in which.

DETAILED DESCRIPTION OF THE PREFERRED EMBODIMENTS

Figure 1:
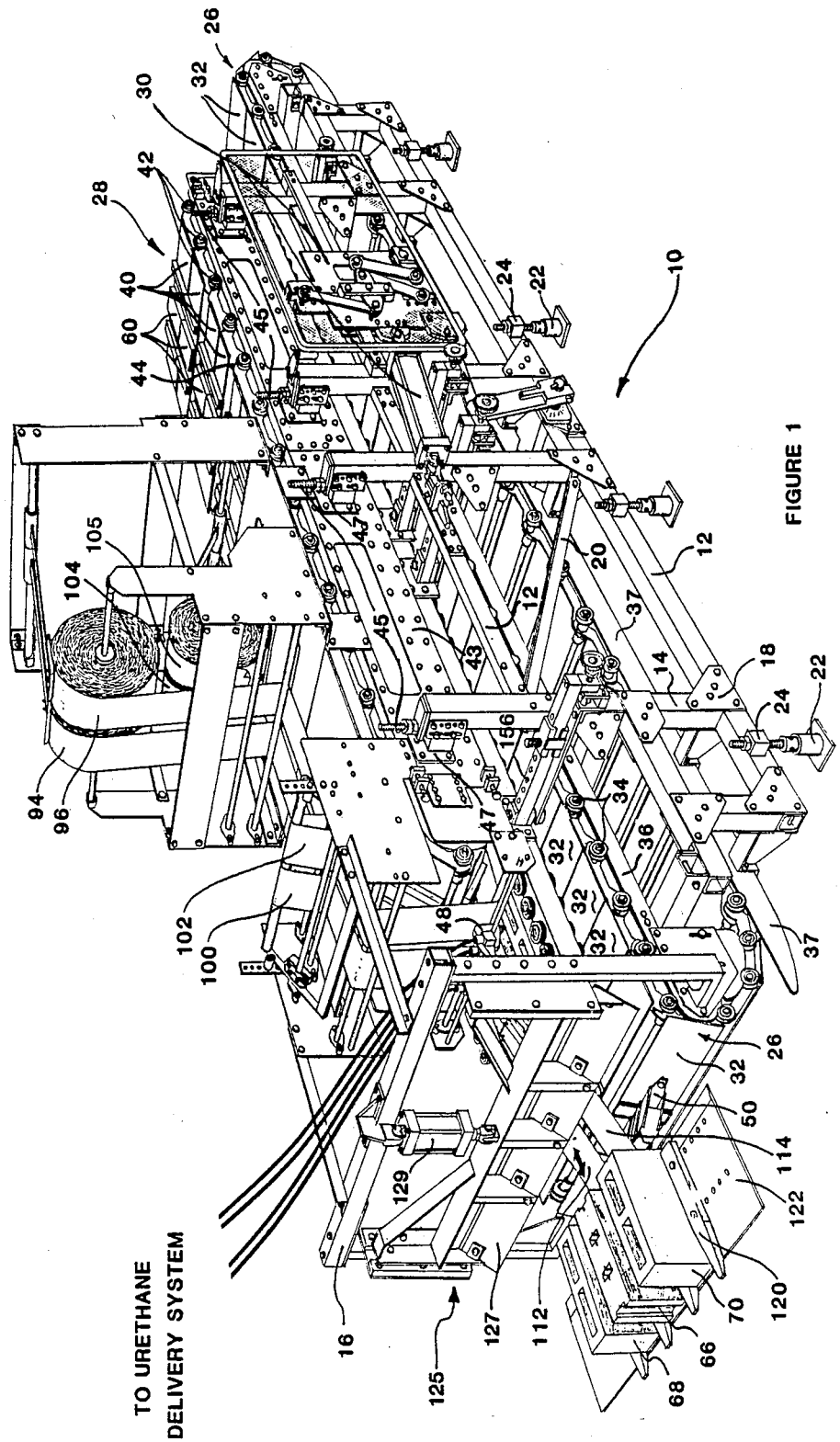
FIG. 1 is a perspective view of the apparatus of the invention showing block components entering the apparatus.
Figure 2:
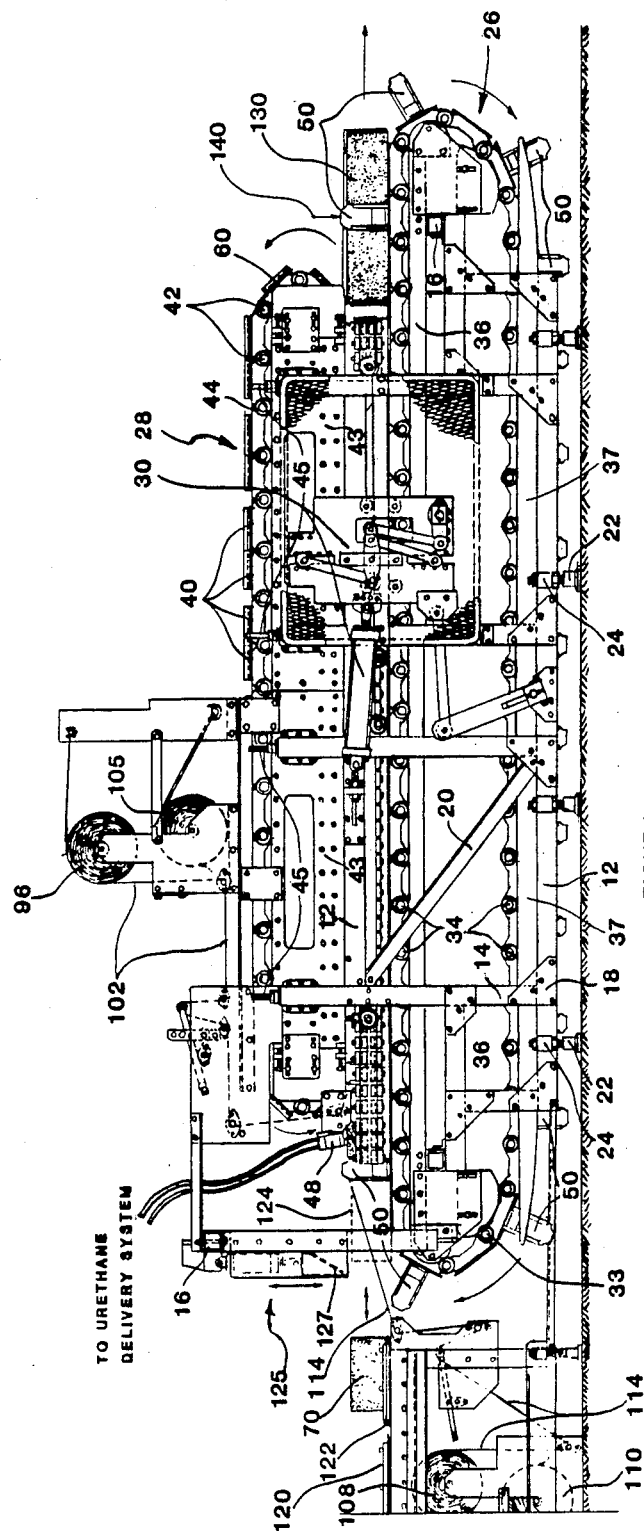
FIG. 2 is a side elevation of the apparatus shown in FIG. 1.
Figure 3:
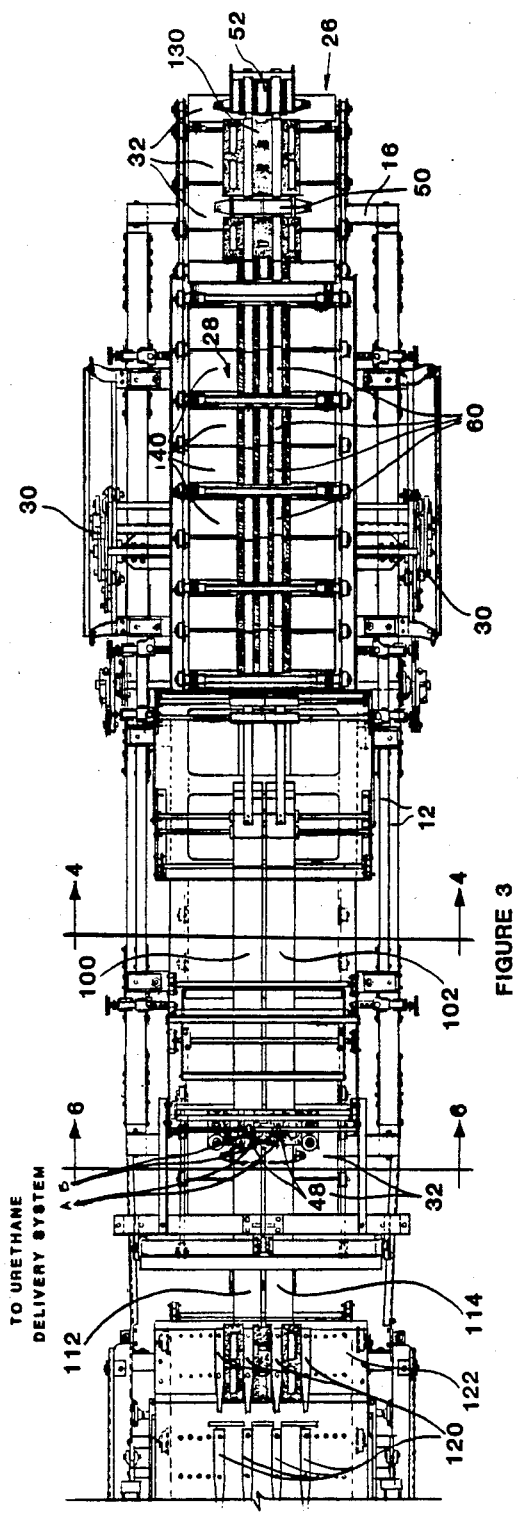
FIG. 3 is a plan view of the said apparatus of the invention.

Referring to FIGS. 1-3, the apparatus of the invention comprises a frame 10 of tubular or channel steel having longitudinal members 12, posts 14 and transverse members 16 interconnected with bolts or the like connectors and reinforced with gussets 18 and diagonal members 20 to provide rigidity. A plurality of leveling feet 22 threaded into blocks 24 welded to lowermost longitudinal member 12 on each side of the apparatus permits desired leveling and longitudinal alignment.

A pair of opposed, continuous plate conveyors 26, 28 mounted longitudinally in apparatus 10 are intermittently driven in a synchronized manner by the drive depicted by numeral 30, well known in the art. Lower conveyor 26 is formed of a plurality of articulated transverse plate segments 32 hinged at adjacent ends 33 to form a substantially continuous planar surface in its operative block-forming position. A roller 34 at each end of segments 32 journalled at the segment hinge connection rolls on a longitudinal guide member 36 which extends substantially the length of apparatus 10 and is seated on transverse members 16, as shown most clearly in FIG. 4, to maintain the lower conveyor in the said planar upper position. Conveyor 26 is supported during its return travel on lower longitudinal guide members 37 supported on gussets 39 secured to the insides of posts 14.

Upper conveyor 28 comprises a plurality of transverse articulated plate segments 40 adapted to provide a substantially planar surface in its operative position when opposed to lower conveyor 26. Segments 40 have a roller 42 journaled at the hinge connection 44 between adjacent segments and also at a midpoint between hinge connections 44, as shown most clearly in FIG. 2. Upper conveyor 28 is shorter than lower conveyor 26 and is centred thereover such that foam injection delivery system 48 can be positioned over lower conveyor 26 at the receiving end of the apparatus and completed concrete blocks are exposed for removal from the opposite discharge end of the apparatus. Rollers 42 travel in a guide frame 43 which is vertically adjustable relative to lower fixed conveyor 26 by means of adjusting screws 45 threaded into brackets 47 at the top of posts 14.

Figure 4:
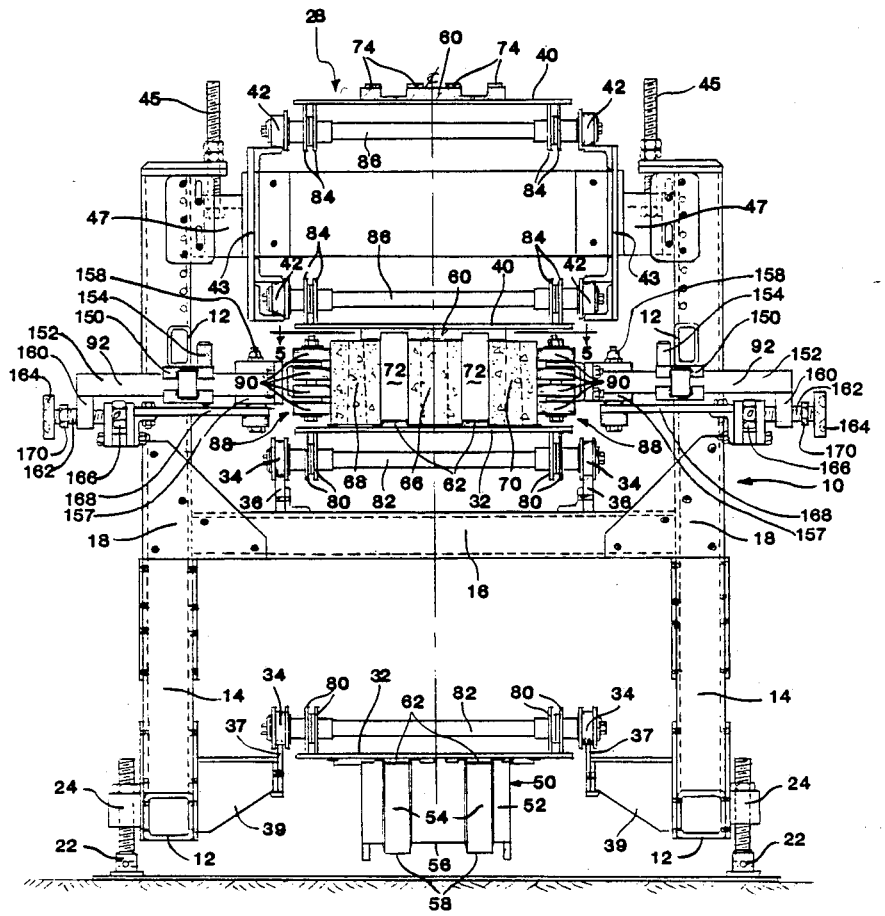
FIG. 4 is a transverse section, partly an elevation, taken through line 4—4 of FIG. 3.
Figure 5:
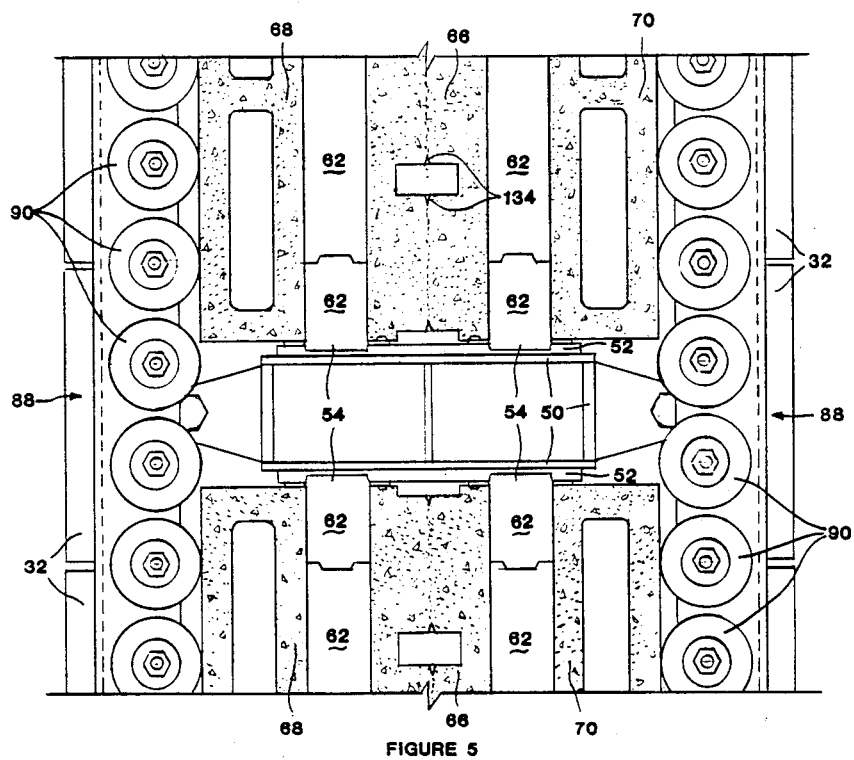
FIG. 5 is a plan view taken along line 5—5 of FIG. 4 showing end frames between adjacent blocks immediately prior to foam injection.

Each of the second segments 32 of lower conveyor 26 has an end frame 50 transversely positioned thereon centrally thereof, as shown more clearly in FIG. 5. Each end frame 50 has a former 52 secured or bolted to each transverse face extending substantially the length of the end frame, each former 52 having a pair of spaced recesses 54 formed therein for reasons which will become apparent as the description proceeds. As shown most clearly in FIG. 4, it will be noted that formers 52 extend beyond the end 56 of each end frame 50 such that extensions 58 will abut and interlock the adjacent face of top forming plate 60 secured such as by bolting to upper segments 40. Lower segments 32 also have forming plates 62 secured thereto to define with upper forming plates 60 the sidewalls of centre block 66 and with the opposed surfaces of backup blocks 68, 70 cavities 72 having, as typified in FIG. 4, an extension of cavities 72 above the height of blocks 66, 68 and 70 but terminating above the bottom edges of said blocks. The height of cavities 72 is readily controlled by raising or lowering upper conveyor 28 by means of adjustment screws 45.

Formers 52 attached to end frame 50 and upper and lower formers 60, 62 attached to upper and lower segments 40, 32 respectively, can be formed of a resiliant material such as rubber or urethane, or a rigid material such as plastic, steel, aluminum or the like. A compressible rubber or foam strip 74 preferably is adhesively secured to the exposed faces of forming plates 52, 60 and 62 so that a liquid and foam-tight, impermeable fit will be achieved between the forming plates 52, 60 and 62 and the imperfect concrete surfaces of the blocks 66, 68 and 70.

Lower segments 32 and upper segments 40 thus are positioned a predetermined distance apart by means of conveyor rollers 34, 42 in lower and upper conveyors 26, 28 respectively. Rollers 34 are journaled on shafts 82 extending between brackets 80 secured to the back side of segments 32, and rollers 42 are journaled on shafts 86 extending between brackets 84 secured to the back side of segments 40. A plurality of vertically aligned gangs 88 of free rolling hard rubber containment wheels 90 mounted on each side of frame 10 by means of adjustable supports 92 provide continuous lateral support and containment of the blocks as they are formed under pressure due to the foamed in place foam insulation. Adjustable supports 92, shown most clearly in FIGS. 1 and 4, each comprises bracket sleeve 150 rigidly secured to post 12 having arm 152 slidably mounted therein. A locking pin 154 is adapted to pass through a hole in bracket 150 into one of a plurality of equally-spaced mating holes 156 in arm 152 to lock arm 152 in bracket 150 such that wheels 90 can be approximately located in their desired lateral position relative to blocks 68 or 70. Wheels 90 are journaled on an axle carried by bracket assembly 157 which contains vertical shaft 158 slidably mounted in a vertical, longitudinal recess in arm 152 such that assembly 157 can be adjusted longitudinally relative to the inner end of arm 152. Flange 160 formed at the outer end of arm 152 has a rod 162 threaded therein for longitudinal axial movement by rotation of knob 164 forming part thereof. The inner end of rod 162 is threaded into a nut or block 166 secured between plates 168 to prevent rotational movement whereby rotation of rod 162 extends or retracts block 166 and link 168 connected to assembly 157 towards or away from blocks 68, 70 to provide fine adjustment of wheels 90 against said blocks. When the vertically aligned gauge 88 are precisely in place, lock nut 170 is forced against flange 160 by means of the threaded rod 162 to lock this position thus eliminating any movement.

With reference now to FIGS. 1 and 2, a pair of laterally-spaced rolls 94, 96 of polyfilm such as polyethylene film are mounted above upper conveyor 28 for feeding two strips 100, 102 as continuous impermeable strips to upper conveyor 28 after urethane delivery system 48. Strips 100, 102 can be a single width strip or can preferably comprise a pair of strips as illustrated fed side-by-side, each of sufficient width to at least cover the width of a cavity 72. A pair of back-up rolls 104, 105 are mounted in proximity to rolls 94, 96 to permit continuity during production. A pair of lower rolls 108, one of which is shown in FIG. 2, is journaled at a level below the upper portion of lower conveyor 26 for providing a pair of polyfilm strips 112, 114 to lower conveyor 26. A pair of back-up rolls 110 are mounted in proximity to rolls 108 to permit continuity of film feed during production.

A single film thickness of polyfilm such as polyethylene, polypropylene or the like plastics film may be used but a double-walled thickness provided by tubular stock is preferred to provide a second layer which essentially precludes the possibility of overlapping pinholes which might allow high-pressure liquid chemicals to escape and to provide the second layer which is continuously attached to the first layer and thus cannot be lost during transportation of the blocks. Dark film is preferred to prevent ultra-violet light to deteriorate the urethane foam. Tin foil, waxed paper or a similar membrane can be an alternative to dark polyfilm or like plastics film in that it is opaque and prevents ultra-violet damage and is an effective membrane.

Backup blocks 68, 70 and centre block 66, separated laterally a predetermined distance apart by guides 120, are shown fed by means of a reciprocating table 122 horizontally to the entrance of apparatus 10 to the position depicted by ghost lines 124 in FIG. 2 for abutment against an end frame 50 on a lower conveyor segment 32. Double walled strips 112, 114 are engaged by the leading edge of the reciprocating table 122 supporting the laterally-spaced feed blocks to advance said strips 112, 114 from the feed rolls 108 forcing said strips 112, 114 down the face of end frame 50 holding end former 52 and between the bottom of the surface plate of the reciprocating table 122 and the top surface of plate segments 32 of lower conveyor 26.

In sequence, the vertically reciprocal guillotine 125 moves downwardly causing the inclined bevel plate 127 to come in contact with the top rear edge of backup blocks 68, 70 and centre block 66 simultaneously, forcing the blocks forwardly into position against the polyfilm that in turn is against the end former 52. Again in sequence, while the guillotine is holding blocks 66, 68 and 70 against end former 52, the reciprocating table 122 is pulled out from under the positioned blocks back into position to receive a new set of laterally-spaced feed blocks. The guillotine is then moved up into the original at-rest position by double-acting piston-cylinder assembly 129 leaving a clearing height required for new feed blocks, and the blocks in position settle on the polyfilm 112, 114 along the bottom of the blocks 66, 68 and 70. In sequence, as lower conveyor 26 moves ahead one position placing blocks 66, 68 and 70 into the spray location, the end frame 50 holding end former 52 immediately following the newly positioned blocks 66, 68 and 70 rotates up into position behind blocks 66, 68 and 70 to fold in polyfilm 112, 114 between the end former 52 and the end surfaces of the blocks, thus applying a continuous sealed polyfilm membrane to the ends and bottom surfaces of the insulation cavities 72. The film being continuous carries over the top of each end former 52 and end frame 50. The bottom and end portions of each of the pair of cavities 72 formed between the blocks is thus closed by the polyfilm which is squeezed tightly against the block surfaces by the compressible rubber or foam strips 74 secured to all the formers.

Figure 6:
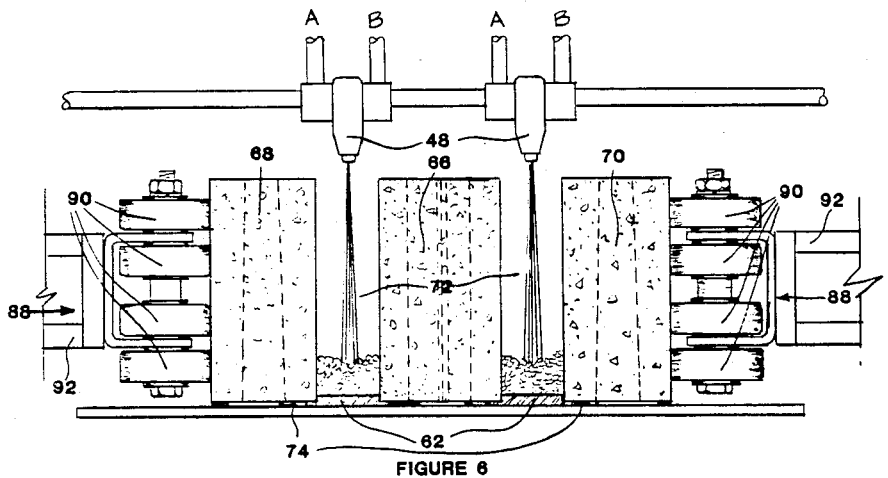
FIG. 6 is a transverse section, partly an elevation, taken along the line 6—6 of FIG. 3 illustrating foam injected in situ.

The end frame 50 on the second following segment 26 advances the three laterally spaced blocks under foam delivery system 48 at which time a foaming mixture of chemicals such as urethane is injected as typified in FIG. 6. It is desirable that the blocks are dry and are at a uniform temperature to attain effective adhesion of the foam with the adjacent block walls. It is also desirable to ensure the delivery of a predetermined quantity of foam to avoid excessive pressures and to ensure adequate foam is provided to completely fill each void.

The set of blocks with foam in situ is advanced to engage upper conveyor 28 which carries film strips 100, 102 which close off the upper portions of cavities 72. With reference now to FIG. 4, the blocks with foam are continually transported through the apparatus while the foam expands and sets under pressure, the escape of the foam from the cavities 72 being prevented by the abutment of the vertical and horizontal forming plates with polyfilm interposed between the foam and the said forming plates which not only prevent the escape of foam but also avoid sticking of the foam to the forming plates.

A hot wire or the like severing device depicted by reference numberal 140, not shown in detail, at the exit end of machine severs the continuous strips of polyfilm 100, 102 and 112, 114 between the blocks while the blocks to be removed are clear of the upper conveyor 28 supported by lower conveyor 26 to free the blocks from the forward end frame 50 and facilitate removal.

The fabricated insulating blocks are discharged in pairs 130 and a prior art in-line block splitter is used for splitting of the centre block 60 along the longitudinal centre line of weakness 130 thereof created by control vees 134. The blocks are cubed and permitted to cure for 24 hours in plant prior to storing outside to eliminate thermal shock to the foam insulation.

The present invention provides a number of important advantages. Structurally sound insulating monolithic blocks having aesthetic exterior or interior faces can be manufactured on a continuous basis. The block components can be varied to produce a multiplicity of combinations of shapes, colours and textures on one or both sides of the finished blocks. For example, a completely plain block or a block with a coloured architectural face on one side can be produced. The centre block can be a solid block prepared for splitting or a pair of block segments adhesively secured together with a desired textured surface previously cast or etched on the surfaces to be exposed. The interior block surfaces to be bonded together by foam insulation can have vertical or horizontal dovetail anchor slots moulded into said surfaces to enhance adhesion and securement of the block components together into a monolithic sandwich construction. Reproducability of the foam layer and containment of foam during forming are provided by the method and apparatus of the invention to provide uniformity of product at an economic cost.

It will be understood that modifications can be made in the embodiment of the method and apparatus of the invention illustrated and described herein without departing from the scope and purview of the invention as defined by the appended claims.

What I claim as new and desire to protect by Letters Patent of the United States is:

1. An apparatus for forming insulated concrete blocks comprising, in combination: a frame having an inlet end and an outlet end; a pair of opposed, continuous, upper and lower conveyors indexed for synchronous travel within said frame, said upper conveyor being shorter than the lower conveyor; each of said conveyors having a plurality of transverse, articulated segments adapted to provide a planar surface in its operative position when the conveyors are opposed to each other; the lower of said conveyors having a plurality of equi-spaced end frames secured thereto perpendicular to the direction of travel of the conveyor, each of said end frames having a resilient former secured to the front and rear faces thereof; forming plates secured to the transverse segments of the upper and lower conveyors for sequentially receiving a plurality of laterally-spaced concrete blocks therebetween defining at least one cavity between said blocks; a foam delivery system for forming insulating foam in situ in said cavity; means for feeding a continuous strip of impermeable film to said conveyors for enclosing the cavities and interposing an impermeable barrier between the foam and the conveyors; and lateral containment wheels mounted on each side of the frame for providing lateral support to the blocks as they are formed.

2. An apparatus for forming insulated concrete blocks as claimed in claim 1 in which said means for feeding continuous strips of impermeable film to said conveyors comprises means for feeding at least one continuous lower strip of impermeable film to the lower conveyor to envelope the end frame for closing the opposite ends and bottom of the said cavity and means for feeding an upper continuous strip of impermeable film downstream of said foam delivery system for enclosing the top of said cavity whereby insulating foam formed in situ in said cavity is substantially completely contained within said cavity.

3. An apparatus for forming insulated concrete blocks as claimed in claim 2 wherein said lower and upper continuous impermeable strips each comprises a double-walled strip of polyfilm formed of flattened tubular stock.

4. An apparatus for forming insulated concrete blocks as claimed in claim 3 in which said frame has a vertically reciprocal guillotine mounted at the inlet end thereof, a double acting piston-cylinder operatively connected to said guillotine for raising and lowering said guillotine, a transverse bevel plate forming a lower part of said guillotine extending transversely thereof whereby said bevel plate engages the rear ends of said laterally-spaced concrete blocks as they are fed to the inmate end of the apparatus for advancing said blocks to the adjacent end frame and for positioning the lower continuous strip of polyfilm against the rear ends of said blocks for engagement by the next succeeding end frame.

5. An apparatus for forming insulated concrete blocks as claimed in claim 4 comprising adjusting means for raising and lower the upper conveyor relative to the lower conveyor whereby different height blocks can be produced and the height of the cavity between said blocks can be adjusted.

6. An apparatus for forming insulated concrete blocks as claimed in claim 5, additionally comprising a reciprocal table mounted at the inlet end of the apparatus frame for laterally aligning and feeding a plurality of concrete blocks to the inlet end of the apparatus for engagement by the guillotine.

7. An apparatus as claimed in claim 6 in which said spaced concrete blocks comprise a centre block and a pair of laterally-spaced back-up blocks, said centre blocks and laterally-spaced back-up blocks defining a pair of cavities therebetween.

8. An apparatus for forming insulating concrete blocks as claimed in claim 7 in which said foam delivery system for forming insulating foam in situ in said cavity is located above said lower conveyor ahead of the upper conveyor whereby said insulating foam can be injected into said cavity after said lower continuous strip of polyfilm has been applied to the ends and bottoms of the cavity prior to covering of said cavity with the upper impermeable polyfilm.

9. An apparatus as claimed in claim 3 in which said polyfilm is selected from the group consisting of polyethylene and polypropylene.

10. An apparatus as claimed in claim 1, adjustable support means for adjusting said lateral containment wheels to provide lateral support to the blocks, each said adjustable support means comprising a bracket mounted on said frame; an arm slidably mounted in said bracket, said arm supporting said lateral containment wheels; means for locking said arm in said bracket; and screw means operatively corrected to said arm for fine adjustment of said wheels against the blocks.

* * * * *